(12) United States Patent
Yoshinaga et al.

(10) Patent No.: US 8,264,098 B2
(45) Date of Patent: Sep. 11, 2012

(54) LOAD DRIVING DEVICE INCLUDING FIRST AND SECOND ELECTRIC POWER LINES BETWEEN POWER SUPPLY AND ELECTRIC POWER CONVERSION DEVICE

(75) Inventors: Fumitaka Yoshinaga, Toyota (JP); Naoyoshi Takamatsu, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 289 days.

(21) Appl. No.: 12/514,934

(22) PCT Filed: Feb. 4, 2008

(86) PCT No.: PCT/JP2008/052093
§ 371 (c)(1),
(2), (4) Date: May 14, 2009

(87) PCT Pub. No.: WO2008/096838
PCT Pub. Date: Aug. 14, 2008

(65) Prior Publication Data
US 2010/0066166 A1    Mar. 18, 2010

(30) Foreign Application Priority Data
Feb. 7, 2007    (JP) ................................. 2007-028138

(51) Int. Cl.
*B60L 1/00* (2006.01)
*B60L 3/00* (2006.01)
*H02G 3/00* (2006.01)
(52) U.S. Cl. .......... 307/9.1; 307/10.1; 701/22; 180/54.1
(58) Field of Classification Search .................. None
See application file for complete search history.

(56) References Cited

U.S. PATENT DOCUMENTS

| | | | | |
|---|---|---|---|---|
| 3,544,803 | A | * | 12/1970 | Taylor ........................... 307/10.1 |
| 4,156,869 | A | * | 5/1979 | Schukantz ..................... 174/108 |
| 4,163,981 | A | * | 8/1979 | Wilson ........................... 343/715 |
| 4,513,361 | A | * | 4/1985 | Rensink ..................... 363/21.04 |

(Continued)

FOREIGN PATENT DOCUMENTS

DE    643016 C    3/1937

(Continued)

OTHER PUBLICATIONS

WO Pub 2007-032391 to Watanabe, english abstract, Mar. 22, 2007.*

(Continued)

*Primary Examiner* — Rexford Barnie
*Assistant Examiner* — Justen Fauth
(74) *Attorney, Agent, or Firm* — Sughrue Mion, PLLC

(57) ABSTRACT

In a hybrid vehicle, rocker outer reinforcements serving as vehicle side frame members in a vehicle width direction extend in a vehicle front-rear direction. An electric power cable is provided such that a portion thereof along the vehicle front-rear direction is placed along an inner side surface of the rocker outer reinforcement in the vehicle width direction. An electric power cable is provided such that a portion thereof along the vehicle front-rear direction is placed along an inner side surface of the rocker outer reinforcement in the vehicle width direction. Further, each of the electric power cables is placed in a space portion formed between the rocker outer reinforcement and a center body pillar serving as an energy absorbing member absorbing energy in the event of a side collision of the vehicle.

23 Claims, 7 Drawing Sheets

U.S. PATENT DOCUMENTS

| | | | |
|---|---|---|---|
| 5,883,484 A | 3/1999 | Akao | |
| 6,097,107 A * | 8/2000 | Ikeda | 307/10.7 |
| 2003/0052771 A1 | 3/2003 | Enders et al. | |
| 2005/0162015 A1* | 7/2005 | Yamaguchi et al. | 307/10.1 |
| 2005/0205316 A1 | 9/2005 | Yamafuji | |
| 2006/0185915 A1 | 8/2006 | Kaneko | |
| 2009/0076672 A1* | 3/2009 | Bajwa | 701/22 |

FOREIGN PATENT DOCUMENTS

| | | |
|---|---|---|
| DE | 10 2005 027 081 A1 | 5/2006 |
| DE | 11 2004 001 465 T5 | 9/2007 |
| EP | 1 289 164 A1 | 3/2003 |
| GB | 426834 | 4/1935 |
| JP | 7-089355 A | 4/1995 |
| JP | 08-047244 A | 2/1996 |
| JP | 10-066383 A | 3/1998 |
| JP | 11-178324 A | 7/1999 |
| JP | 2000177511 * | 6/2000 |
| JP | 2001-069655 A | 3/2001 |
| JP | 2001-326300 A | 11/2001 |
| JP | 2004-149031 A | 5/2004 |
| JP | 2005-075027 A | 3/2005 |
| JP | 2005-078829 A | 3/2005 |
| JP | 2005-125956 A | 5/2005 |

OTHER PUBLICATIONS

German Office Action dated Jun. 21, 2011, issued in corresponding German Patent Application No. 11 2008 000 362.9-34.

* cited by examiner

US 8,264,098 B2

LOAD DRIVING DEVICE INCLUDING FIRST AND SECOND ELECTRIC POWER LINES BETWEEN POWER SUPPLY AND ELECTRIC POWER CONVERSION DEVICE

TECHNICAL FIELD

The present invention relates to a load driving device, and more particular to a load driving device configured to include a switching element and receiving electric power from a battery to drive an electric load.

BACKGROUND ART

Japanese Patent Laying-Open No. 10-066383 discloses a drive control device for a permanent magnet synchronous motor (PM motor). The drive control device includes a boost circuit boosting a battery voltage prior to be supplied to an electric power converter and in response to a command, and means for causing the boost circuit to perform a boost operation such that a boosted voltage value is higher than a voltage on a DC (direct current) terminal side of the electric power converter that is required to achieve a target operation point of the PM motor.

In the drive control device, when the target operation point of the PM motor is located at a higher rotation side than an outputtable range with the present battery voltage, the battery voltage is boosted such that the target operation point is included in the outputtable range. As a result, extension of the outputtable range when the PM motor performs power running, which has been achieved by field weakening control, can be achieved without causing a loss due to a field weakening current and a reduction in system efficiency due to the loss.

In the technique disclosed in Japanese Patent Laying-Open No. 10-066383 described above, the boost circuit has a configuration including two transistors connected in series in a forward direction between DC terminals of an IPM (Intelligent Power Module), two diodes connected in antiparallel with these transistors, respectively, and a boost reactor having one end connected to a connection point between the two transistors and the other end connected to a battery side. In such a configuration, a switching operation of the two transistors is controlled in response to a command from a controller on a boost ratio for the boost circuit.

In a configuration using a boost circuit as disclosed in Japanese Patent Laying-Open No. 10-066383, when a transistor of the boost circuit performs a switching operation, an AC (alternating current) current that depends on a switching frequency thereof (hereinafter also referred to as a ripple current) occurs. Due to the ripple current, a vibration occurs in a battery, which may cause noise.

Accordingly, the present invention has been made to solve the above-mentioned problem, and one object of the present invention is to provide a load driving device capable of suppressing vibration noise in a power supply caused by a ripple current.

DISCLOSURE OF THE INVENTION

According to the present invention, a load driving device includes: a power supply; an electric power conversion device configured to include a switching element and converting electric power between DC power from the power supply and AC power driving an electric load through switching control of the switching element; and first and second electric power lines forming an electric power supply path between the power supply and the electric power conversion device. The first electric power line is placed between one electrode of the power supply and the electric power conversion device, and the second electric power line is placed between the other electrode of the power supply and the electric power conversion device. The first and second electric power lines are placed such that a region surrounded by a circulating path formed between the power supply and the electric power conversion device has an increased area, when compared to that in a cabling structure that can be established based on positional relationship between the power supply and the electric power conversion device.

According to the load driving device described above, the first and second electric power lines are placed such that an inductance that is structurally present in a circular path configured with the power supply, the first and second electric power lines, and the electric power conversion device has an increased value, when compared to that in a cabling structure generally established based on the positional relationship between the power supply and the electric power conversion device. Thereby, the first and second electric power lines can be configured to have high inductance values, and thus the power supply has an apparent high impedance, allowing a ripple current, superimposed on a DC current flowing through the power supply when a switching operation is performed in the electric power conversion device, to be decreased. Since a required inductance value can be achieved by the cabling structure of the electric power lines on this occasion, vibration noise from the power supply can be suppressed.

According to the present invention, a load driving device drives an electric load mounted to a vehicle. The load driving device includes: a power supply; an electric power conversion device configured to include a switching element and converting electric power between DC power from the power supply and AC power driving the electric load through switching control of the switching element; and first and second electric power lines forming an electric power supply path between the power supply and the electric power conversion device. The first electric power line is placed between one electrode of the power supply and the electric power conversion device, and at least a portion along a vehicle front-rear direction of the first electric power line is placed at one side end portion in a vehicle width direction. The second electric power line is placed between the other electrode of the power supply and the electric power conversion device, and at least a portion along the vehicle front-rear direction of the second electric power line is placed at the other side end portion in the vehicle width direction.

According to the load driving device described above, an area of a region surrounded by a circular path configured with the power supply, the first and second electric power lines, and the electric power conversion device is increased by placing the first and second electric power lines at the side end portions in the vehicle width direction, respectively. Thereby, an inductance that is structurally present in the circular path can be increased, and thus the first and second electric power lines can be configured to have high inductance values.

According to the present invention, a load driving device drives an electric load mounted to a vehicle. The load driving device includes: a power supply; an electric power conversion device configured to include a switching element and converting electric power between DC power from the power supply and AC power driving the electric load through switching control of the switching element; and first and second electric power lines forming an electric power supply path between the power supply and the electric power conversion device. The first electric power line is placed between one electrode of the power supply and the electric power conversion device, and at least a portion along a vehicle front-rear direction of the first electric power line is placed at one side end portion in a vehicle vertical direction. The second electric power line is placed between the other electrode of the power supply and the electric power conversion device, and at least a portion along the vehicle front-rear direction of the second electric power line is placed at the other side end portion in the vehicle vertical direction.

According to the load driving device described above, an area of a region surrounded by a circular current path configured with the power supply, the first and second electric power lines, and the electric power conversion device is increased by placing the first and second electric power lines at the side end portions in the vehicle vertical direction, respectively. Thereby, an inductance that is structurally present in the current path can be increased, and thus the first and second electric power lines can be configured to have high inductance values.

Preferably, at least a portion of each of the first and second electric power lines is placed in a space portion formed in a vehicle frame member to extend in the vehicle front-rear direction.

According to the load driving device described above, the inductance that is structurally present in the current path described above can be increased by placing each of the first and second electric power lines using the space portion formed in the vehicle frame member, without newly providing a space for placing the electric power line.

Preferably, the space portion is a gap portion formed between the vehicle frame member and an energy absorbing member absorbing energy in the event of a collision of the vehicle.

According to the load driving device described above, permeability of the current path described above is increased and the number of flux interlinkage is increased, and thus the inductance that is structurally present in the current path can be further increased.

Preferably, at least one of the first and second electric power lines is placed such that the at least a portion thereof is spirally wound around a vehicle frame member.

According to the load driving device described above, the self inductance of at least one of the first and second electric power lines is increased in proportion to the square of the number of turns of the electric power line, and thus the inductance values of the first and second electric power lines can be further increased.

Preferably, the electric load is a motor for driving a vehicle, and the power supply and the electric power conversion device are mounted to be separated in a vehicle front-rear direction.

According to the load driving device described above, a required inductance value can be achieved by the cabling structure of the electric power lines, and thus vibration noise from the power supply for driving the vehicle can be suppressed.

According to another aspect of the present invention, a load driving device includes: a power supply; an electric power conversion device configured to include a switching element and converting electric power between DC power from the power supply and AC power driving an electric load through switching control of the switching element; and first and second electric power lines forming an electric power supply path between the power supply and the electric power conversion device. The first electric power line is placed between one electrode of the power supply and the electric power conversion device, and the second electric power line is placed between the other electrode of the power supply and the electric power conversion device. At least one of the first and second electric power lines is placed such that at least a portion thereof along a longitudinal direction is spirally placed.

According to the load driving device described above, the self inductance of at least one of the first and second electric power lines is increased in proportion to the square of the number of turns of the electric power line. Thereby, the first and second electric power lines are configured to have high inductance values, and thus the power supply has an apparent high impedance, allowing a ripple current, superimposed on a DC current flowing through the power supply when a switching operation is performed in the electric power conversion device, to be decreased. Since a required inductance value can be achieved by the cabling structure of the electric power lines on this occasion, vibration noise from the power supply can be suppressed without causing an increase in size and cost of the load driving device.

Preferably, the electric load is a motor for driving a vehicle. The power supply and the electric power conversion device are mounted to be separated in a vehicle front-rear direction. At least one of the first and second electric power lines is placed such that at least a portion thereof along the vehicle front-rear direction is spirally wound around a vehicle frame member.

According to the load driving device described above, by placing at least one of the first and second electric power lines to be spirally wound around a vehicle side frame member, the self inductance of the electric power line is increased in proportion to the square of the number of turns of the electric power line and to permeability. Thereby, the first and second electric power lines can be configured to have high inductance values.

Preferably, the first electric power line and the second electric power line are placed such that the at least a portion of the first electric power line and the at least a portion of the second electric power line are wound around the vehicle frame member in common, in winding directions opposite to each other.

According to the load driving device described above, by placing the first and second electric power lines to be spirally wound around a common vehicle side frame member in opposite directions, fluxes in the same direction are generated in the electric power lines, and thus the number of flux interlinkage is increased. As a result, the first and second electric power lines can be configured to have high inductance values.

According to the present invention, by configuring electric power lines connecting a power supply and a driving device to have high inductance values using a cabling structure, a ripple current superimposed on a DC current flowing through the power supply when a switching operation is performed in the driving device can be decreased. As a result, vibration noise in the power supply can be suppressed.

BEST MODE FOR CARRYING OUT THE INVENTION

Figure 1:
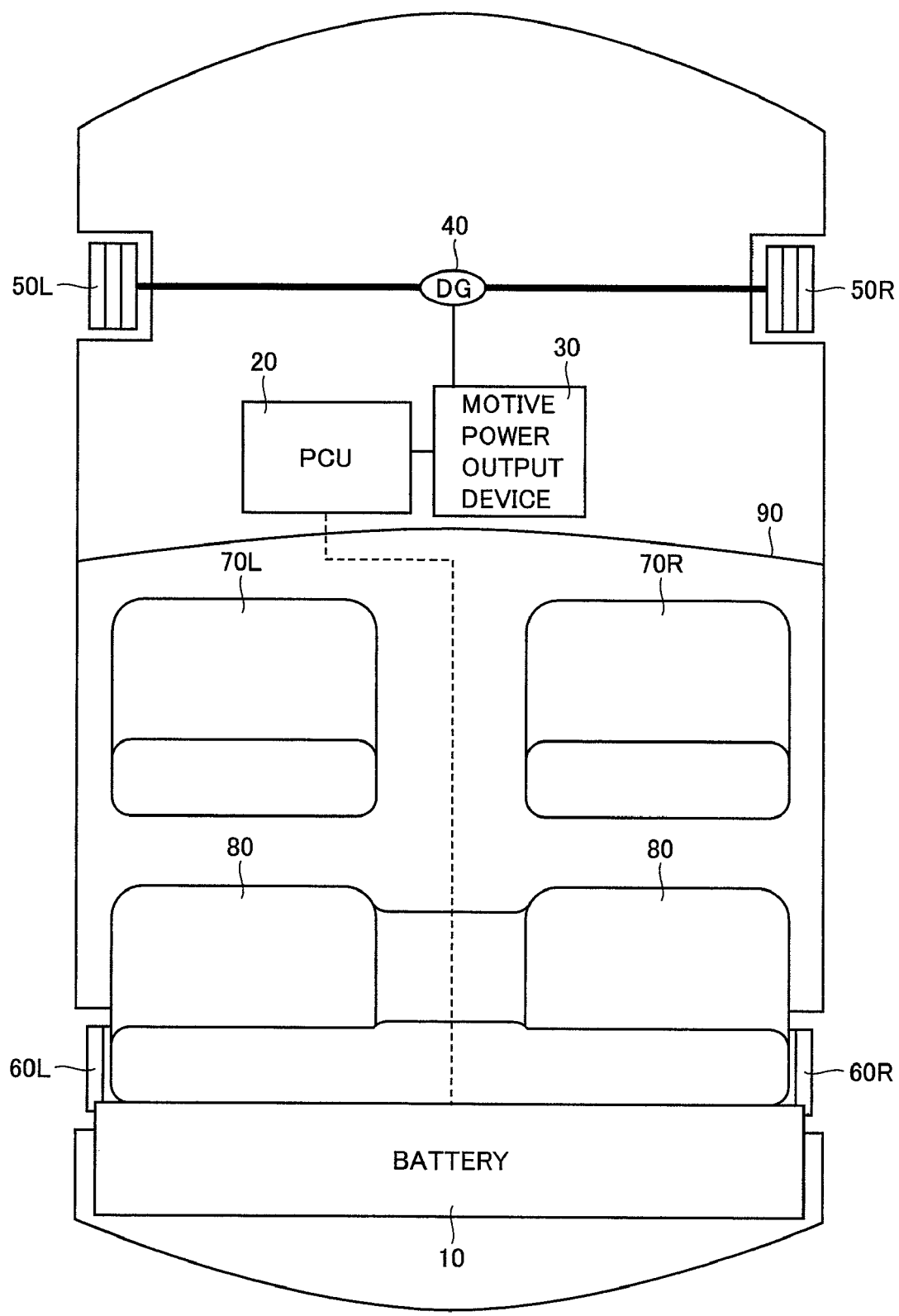
FIG. 1 is a schematic block diagram showing an entire configuration of a hybrid vehicle illustrated as an example to which a load driving device in accordance with the present invention is mounted.

Hereinafter, embodiments of the present invention will be described in detail with reference to the drawings, in which identical or corresponding parts will be designated by the same reference numerals.

[First Embodiment]

FIG. 1 is a schematic block diagram showing an entire configuration of a hybrid vehicle illustrated as an example to which a load driving device in accordance with the present invention is mounted.

Referring to FIG. 1, a hybrid vehicle 5 includes a battery 10, a PCU (Power Control Unit) 20, a motive power output device 30, a differential gear (DG) 40, front wheels 50L and 50R, rear wheels 60L and 60R, front seats 70L and 70R, and a rear seat 80.

Battery 10 is disposed behind rear seat 80. Battery 10 is electrically connected to PCU 20. PCU 20 is disposed, for example, using a region below front seats 70L and 70R, that is, a region below a floor. Motive power output device 30 is disposed at an engine room located in front of a dashboard 90. PCU 20 is electrically connected to motive power output device 30. Motive power output device 30 is coupled to DG 40.

Battery 10, which is a DC power supply, is formed for example of a secondary battery such as a nickel hydride battery or a lithium ion battery. Battery 10 supplies a DC voltage to PCU 20, and is charged by a DC voltage from PCU 20.

PCU 20 boosts the DC voltage from battery 10, and converts the boosted DC voltage into an AC voltage to drive and control a motor generator included in motive power output device 30. Further, PCU 20 converts an AC voltage generated by the motor generator included in motive power output device 30 into a DC voltage to charge battery 10. Specifically, PCU 20 is provided as an "electric power conversion device" converting electric power between DC power supplied by battery 10 and both of AC power driving and controlling a motor and AC power generated by a generator.

Motive power output device 30 transmits motive power generated by an engine and/or the motor generator to front wheels 50L and 50R via DG 40 to drive front wheels 50L and 50R. Motive power output device 30 also generates electric power by rotation force of front wheels 50L and 50R, and supplies the generated electric power to PCU 20. It is also possible to provide a motor generator having both functions of a motor and a generator in motive power output device 30.

DG 40 transmits the motive power from motive power output device 30 to front wheels 50L and 50R, and transmits the rotation force of front wheels 50L and 50R to motive power output device 30.

Figure 2:
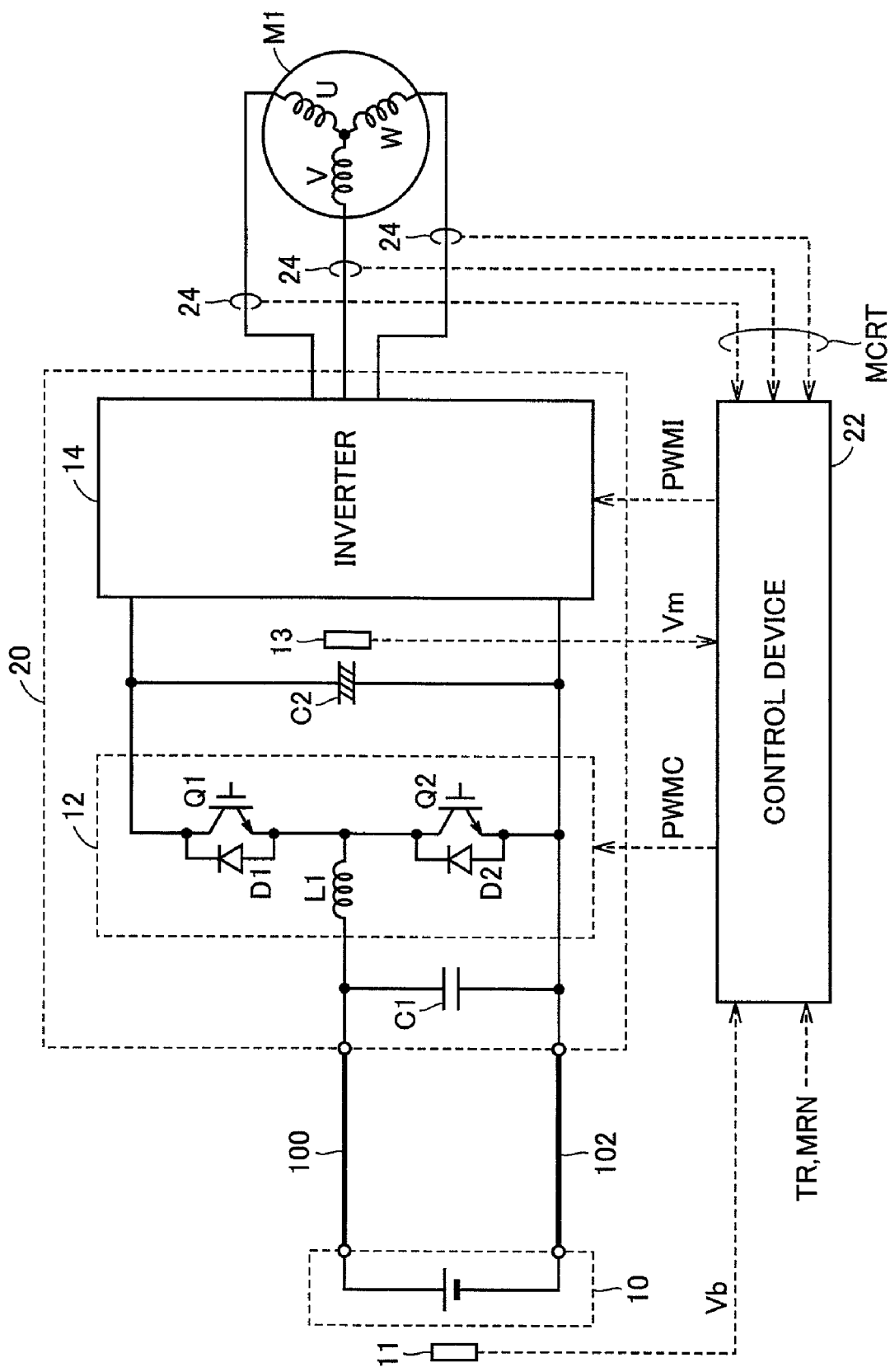
FIG. 2 is a block diagram illustrating a configuration of a drive system for the hybrid vehicle shown in FIG. 1.

FIG. 2 is a block diagram illustrating a configuration of a drive system for hybrid vehicle 5 shown in FIG. 1.

Referring to FIG. 2, battery 10 and PCU 20 are electrically connected by electric power cables 100 and 102. PCU 20 includes a boost converter 12, capacitors C1 and C2, and an inverter 14.

Capacitor C1 smoothes the DC voltage supplied from battery 10 via electric power cables 100 and 102, and supplies the smoothed DC voltage to boost converter 12.

Boost converter 12 includes a reactor L1, IGBT (Insulated Gate Bipolar Transmitter) elements Q1 and Q2, and diodes D1 and D2.

IGBT elements Q1 and Q2 are connected in series between a power supply line and an earth line. IGBT element Q1 has a collector connected to the power supply line, and an emitter connected to a collector of IGBT element Q2. An emitter of IGBT element Q2 is connected to the earth line. Diodes D1 and D2 are provided as antiparallel diodes of IGBT elements Q1 and Q2, respectively.

Reactor L1 has one end connected to the power supply line, and the other end connected to a connection node between IGBT elements Q1 and Q2. Capacitor C2 is connected between the power supply line and the earth line.

Boost converter 12 boosts the DC voltage supplied from capacitor C1, and supplies the boosted DC voltage to capacitor C2. More specifically, upon receiving a signal PWMC from a control device 22, boost converter 12 boosts the DC voltage according to a period in which IGBT element Q2 is turned on by signal PWMC, and supplies the boosted DC voltage to capacitor C2.

Further, upon receiving signal PWMC from control device 22, boost converter 12 lowers a DC voltage supplied from inverter 14 via capacitor C2, and charges battery 10.

Capacitor C2 smoothes the DC voltage from boost converter 12, and supplies the smoothed DC voltage to inverter 14. A voltage sensor 13 detects a voltage across capacitor C2, that is, an output voltage Vm of boost converter 12 (equivalent to an input voltage to inverter 14; hereinafter the same applies), and outputs the detected output voltage Vm to control device 22.

Upon receiving the DC voltage from capacitor C2, inverter 14 converts the DC voltage into an AC voltage based on a signal PWMI from control device 22, and drives an AC motor M1. Thereby, AC motor M1 is driven to generate a required torque designated by a torque command value TR.

Further, at the time of regenerative braking of hybrid vehicle 5, inverter 14 converts an AC voltage generated by AC motor M1 into a DC voltage based on signal PWMI from control device 22, and supplies the converted DC voltage to boost converter 12 via capacitor C2. The regenerative braking referred to herein includes braking with regeneration through a foot brake operation by a driver of hybrid vehicle 5, and deceleration (or stopping acceleration) of the vehicle while regenerating power by releasing an accelerator pedal during running without operating the foot brake.

That is, AC motor M1 is equivalent to an AC motor for driving a vehicle, specifically, to the motor generator included in motive power output device 30 shown in FIG. 1. In the present embodiment, the AC motor is representatively shown as a three-phase motor.

A current sensor 24 detects a motor current MCRT flowing into AC motor M1, and outputs the detected motor current MCRT to control device 22.

Control device 22 receives a target value TR of a drive torque (hereinafter also referred to as a torque command value) required to AC motor M1 and a motor rotation number MRN from an external ECU (Electrical Control Unit), receives output voltage Vm from voltage sensor 13, receives a DC voltage Vb from a voltage sensor 11, and receives motor current MCRT from current sensor 24. Based on output voltage Vm, torque command value TR, and motor current MCRT, control device 22 generates signal PWMI for controlling switching of an IGBT element (not shown) in inverter 14 when inverter 14 drives AC motor M1, and outputs the generated signal PWMI to inverter 14.

Further, control device 22 generates signal PWMC for controlling switching of IGBT elements Q1 and Q2 in boost converter 12 based on DC voltage Vb, output voltage Vm, torque command value TR, and motor rotation number MRN when inverter 14 drives AC motor M1, and outputs the generated signal PWMC to boost converter 12.

Signal PWMC is a signal for driving boost converter 12 when boost converter 12 performs voltages conversion between battery 10 and inverter 14. Control device 22 performs feedback control on output voltage Vm when boost converter 12 converts DC voltage Vb from battery 10 into output voltage Vm, and generates signal PWMC for driving boost converter 12 such that output voltage Vm is equal to a voltage command Vdc_com.

Further, at the time of regenerative braking of the hybrid vehicle or an electric vehicle, control device 22 generates signal PWMI for converting the AC voltage generated by AC motor M1 into a DC voltage, and outputs the generated signal PWMI to inverter 14. On this occasion, the switching of the IGBT element (not shown) in inverter 14 is controlled by signal PWMI, and inverter 14 converts the AC voltage generated by AC motor M1 into a DC voltage and supplies the DC voltage to boost converter 12.

In addition, at the time of regenerative braking of the hybrid vehicle or the electric vehicle, control device 22 generates signal PWMC for lowering the DC voltage supplied from inverter 14, and outputs the generated signal PWMC to boost converter 12. Thereby, the AC voltage generated by AC motor M1 is converted into a DC voltage, lowered, and supplied to battery 10.

As described above, control of the switching of IGBT elements Q1 and Q2 allows boost converter 12 to boost or lower the DC voltage. As a result of the control of the switching of IGBT elements Q1 and Q2, a ripple current occurs in a current IL flowing through reactor L1 in boost converter 12 (hereinafter also referred to as a reactor current).

Figure 3:
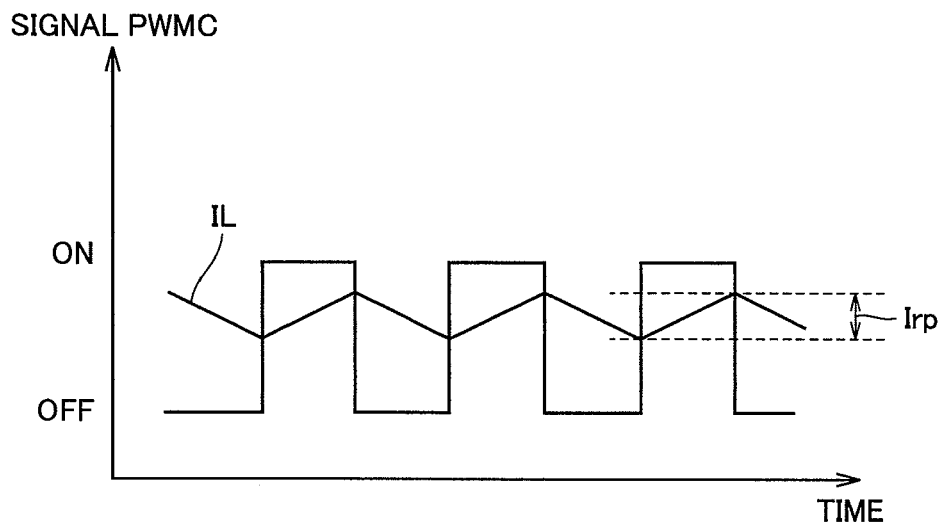
FIG. 3 is a timing chart of a signal PWMC transmitted to a boost converter.

Referring to FIG. 3, the relationship between an operation of boost converter 12 of FIG. 2 and reactor current IL will be described.

FIG. 3 shows the transition of signal PWMC transmitted to boost converter 12. As shown in FIG. 3, signal PWMC is switched between an on state (ON) and an off state (OFF). The sum of the ON time period and the OFF time period on this occasion is equivalent to one cycle of signal PWMC (control cycle). The control cycle can be determined from a carrier frequency for turning on/off IGBT elements Q1 and Q2 included in boost converter 12.

When such signal PWMC is being output, a cyclically increasing and decreasing ripple current Irp superimposes on reactor current IL. A cycle that ripple current Irp increases and decreases is identical to the control cycle of boost converter 12.

Figure 4:
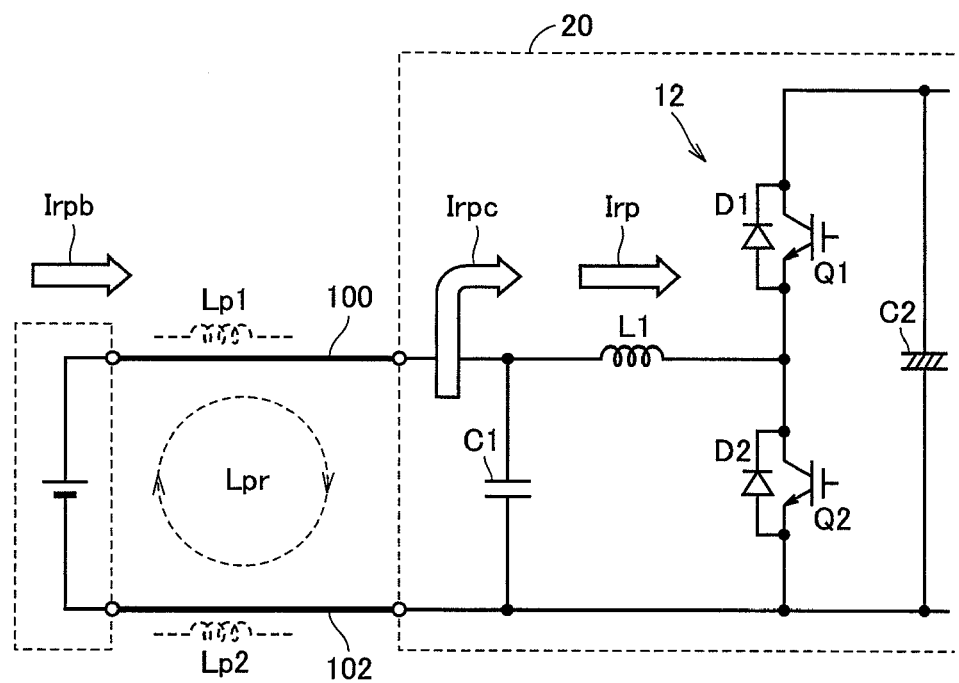
FIG. 4 is a circuit diagram of a battery, a capacitor, and the boost converter shown in FIG. 2.

FIG. 4 is a circuit diagram of battery 10, capacitor C1, and boost converter 12 shown in FIG. 2.

Referring to FIG. 4, when the switching of IGBT elements Q1 and Q2 in boost converter 12 is controlled at a prescribed carrier frequency, ripple current Irp according to the carrier frequency flows into reactor L1, as described above. Ripple current Irp is the sum of a ripple current Irpb flowing into battery 10 and a ripple current Irpc flowing into capacitor C1.

$$Irp = Irpb + Irpc \quad (1)$$

When it is assumed that ripple current Irpb flowing into battery 10 has a peak-to-peak value $\Delta Irpb$ and ripple current Irpc flowing into capacitor C1 has a peak-to-peak value $\Delta Irpc$, the following relationship is established between $\Delta Irpb$ and $\Delta Irpc$:

$$\Delta Irpb : \Delta Irpc = 1/Zb : 1/Zc \quad (2),$$

where Zb is an impedance of battery 10, and Zc is an impedance of capacitor C1.

As is clear from equation (2), peak-to-peak value $\Delta Irpb$ of the ripple current flowing into battery 10 has a magnitude inversely proportional to impedance Zb of battery 10, and becomes greater with a decrease in impedance Zb. Ripple current Irpb flowing into battery 10 causes an expansion/contraction action in battery 10, and thereby an air vibration occurs to generate noise.

In particular, when battery 10 is formed of a lithium ion battery, although a large current charging/discharging characteristic can be obtained by the characteristic that it has a low internal resistance value, there has been a problem that ripple current Irpb increases due to low impedance Zb, and deteriorates the degree of the noise.

There also has been a problem that, when a vibration occurs in an electrode plate of battery 10, binding strength of an active material forming the electrode plate is reduced due to a change over time, and the electric power collecting property of battery 10 is deteriorated.

Specifically, the electrode plate of the battery is formed by binding an active material in powdered form such as copper ions with a binding agent. The active material expands/contracts in response to charging/discharging of the battery, and the binding agent binding the active material expands/contracts in response to the expansion/contraction of the active material. When the expansion/contraction of the binding agent is repeated for a long period of time by receiving a ripple current from a boost circuit, the binding agent changes over time, resulting in a reduction in the binding strength of the binding agent. Thereby, the active material falls off, and thus the electric power collecting property of the battery is deteriorated.

To decrease ripple current Irpb flowing into battery 10, a technique of decreasing impedance Zc of capacitor C1 connected in parallel with battery 10 seems to be effective, based on the relationship represented by equation (2) described above. However, this technique requires configuring capacitor C1 with a large-capacity, large-sized element, leading to an increase in size and cost of the load driving device.

Further, decreasing ripple current Irp of reactor current IL by increasing an inductance of reactor L1 in boost converter 12 is also contemplated as another technique. However, since reactor L1 stores/releases electric power from/to battery 10 or inverter 14 in response to the control of the switching of IGBT elements Q1 and Q2, and thereby causes an voltage conversion operation to be performed, there is a limit in increasing the inductance, from the viewpoint of ensuring control responsiveness.

Therefore, in the load driving device in accordance with the present invention, electric power cables 100 and 102 connected between battery 10 and capacitor C1 are configured to have high inductance values to cause battery 10 to have impedance Zb that appears to be high, as shown in FIG. 4.

With such a configuration, the load driving device in accordance with the present invention can suppress vibration noise in battery 10 without causing an increase in the size and cost of the device, as described below. In particular, when the present invention is applied to a load driving device including battery 10 formed of a lithium ion battery, vibration noise can be suppressed effectively by increasing an apparent impedance. Further, deterioration in the electric power collecting property of battery 10 can also be suppressed.

Specifically, the impedance of battery 10 as seen from reactor L1 in boost converter 12 has a value obtained by adding inductances Lp1 and Lp2 of electric power cables 100 and 102, respectively, and an inductance Lpr that is structurally present in a closed circuit formed between battery 10 and the PCU via electric power cables 100 and 102 (hereinafter also referred to as a loop inductance), to original impedance Zb of battery 10. Therefore, in view of the relationship represented by equation (2), ripple current Irpb flowing into battery 10 can be decreased by increasing at least one of inductances Lp1 and Lp2 and loop inductance Lpr. As a result, vibration noise generated due to the expansion/contraction action in battery 10 caused by ripple current Irpb can be suppressed.

Since inductances Lp1 and Lp2 of electric power cables 100 and 102, respectively, and loop inductance Lpr have low inductance values (approximately several nanohenries (nH)), when compared to that of reactor L1 in boost converter 12 (approximately several hundred nanohenries (nH)), they can be achieved by a cabling structure of electric power cables 100 and 102. That is, an increase in the size and cost of the load driving device can be avoided, when compared to the case where impedance Zc of capacitor C1 is decreased as described above.

More specifically, the inductance values of electric power cables 100 and 102 are set such that peak-to-peak value ΔIrpb of the ripple current flowing into battery B does not exceed a prescribed allowable current value that allows noise to be suppressed. Specifically, a prescribed threshold value Ilim is set as peak-to-peak value ΔIrpb of ripple current Irpb such that the degree of the noise generated due to the expansion/contraction action in battery B does not exceed a prescribed allowable level. Then, impedance Zb of battery B is determined such that the left side of equation (2) is equal to a ratio between threshold value Ilim and a value obtained by subtracting threshold value Ilim from peak-to-peak value ΔIrp of the ripple current flowing into reactor L1 (=Ilim:ΔIrp−Ilim). Based on the determined impedance Zb, the inductance values of electric power cables 100 and 102 are set. The inductance values set on this occasion are approximately several nanohenries (nH), which are significantly lower than the inductance of reactor L1 in boost converter 12 (approximately several hundred nanohenries (nH). Therefore, the inductance values can be achieved by the cabling structure of electric power cables 100 and 102, as described below.

[Cabling Structure of Electric Power Cables]

The cabling structure of the electric power cables in accordance with the embodiments of the present invention will now be described in detail.

Hereinafter, firstly, a cabling structure of the electric power cables conventionally used in general will be described with reference to FIG. 5, for comparison. Next, a cabling structure of the electric power cables in accordance with a first embodiment of the present invention will be described with reference to FIG. 6.

Figure 5:
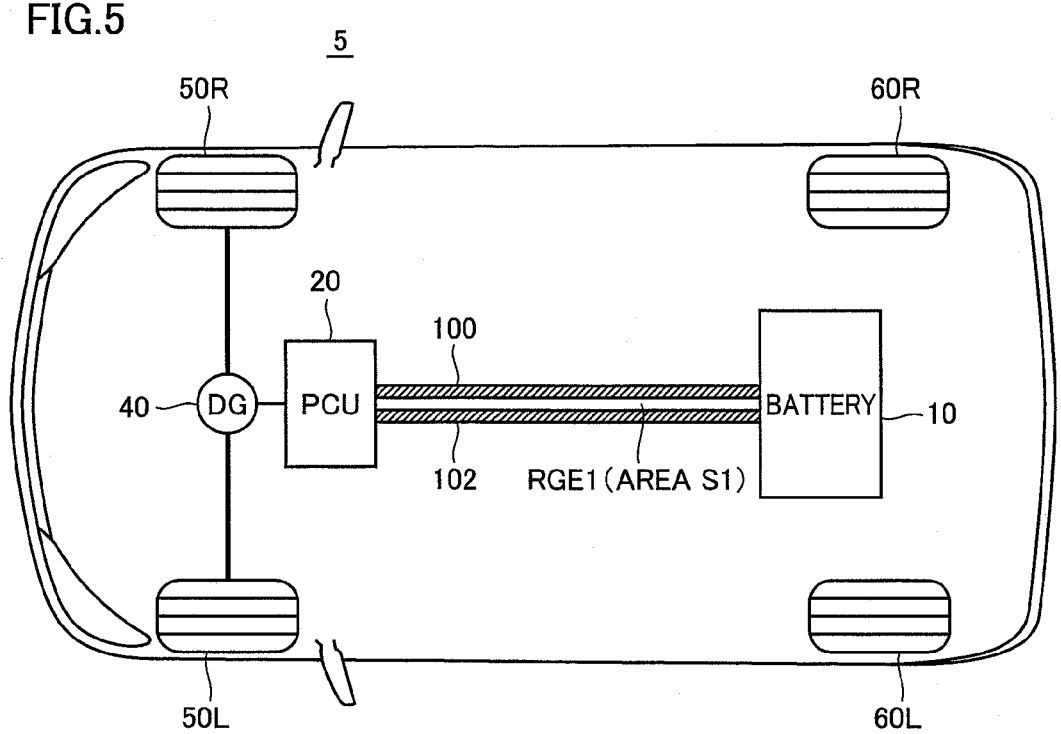
FIG. 5 is a view for illustrating an ordinary cabling structure of electric power cables.

Referring to FIG. 5, in the conventional cabling structure, electric power cables 100 and 102 are placed in substantially parallel in a vehicle front-rear direction, between battery 10 disposed behind the rear seat (FIG. 1) and PCU 20 disposed in the region below the front seats (FIG. 1), that is, the region below the floor. It is to be noted that this cabling structure is an exemplary cabling structure that can be established based on the positional relationship between battery 10 and PCU 20.

In the example of FIG. 5, electric power cables 100 and 102 pass through a floor panel below the rear seat, get out of a vehicle cabin, pass along reinforcements (vehicle frame members) provided in the region below the floor, and then are connected to PCU 20.

It is to be noted that a region RGE1 shown in FIG. 5 is a region in a closed circuit having a current path through which a current flows from a positive electrode of battery 10, through electric power cable 100, PCU 20, and electric power cable 102, to a negative electrode of battery 10, structurally surrounded by the closed circuit. In the cabling structure shown in FIG. 5, an area S1 of region RGE1 can be approximated to a value obtained by multiplying a cable length of electric power cables 100 and 102 by a cable interval therebetween.

Further, loop inductance Lrp that is present in the closed circuit can be expressed by the following equation (3), by approximating the closed circuit to an infinitely long solenoid with the number of turns n=1:

$$Lrp = \mu n^2 S = \mu \quad (3),$$

where μ is a permeability of the closed circuit, and S is an area of region RGE1 surrounded by the closed circuit (S=S1).

As is clear from equation (3), it is found that loop inductance Lrp is increased in proportion to area S of the region surrounded by the closed circuit. Therefore, loop inductance Lrp can be increased by placing electric power cables 100 and 102 such that area S of the region is increased when compared to that in the cabling structure that can be established based on the positional relationship between battery 10 and PCU 20.

Figure 6:
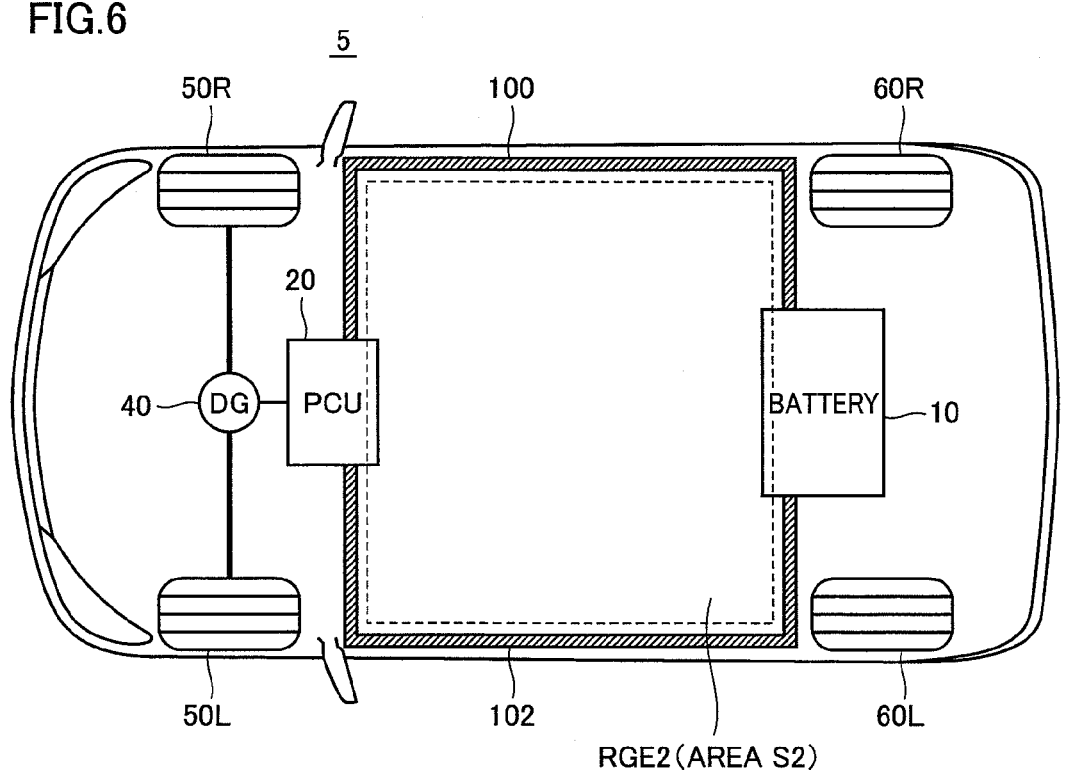
FIG. 6 is a view for illustrating a cabling structure of electric power cables in accordance with a first embodiment of the present invention.

Specifically, referring for example to FIG. 6, electric power cable 100 is provided such that a portion thereof along the vehicle front-rear direction is placed at a right side end portion in a vehicle width direction (a side of the vehicle), and electric power cable 102 is provided such that a portion thereof along the vehicle front-rear direction is placed at a left side end portion in the vehicle width direction.

In the example shown in FIG. 6, the cable interval is widened as much as possible by placing a portion of electric power cable 100 and a portion of electric power cable 102 at the end portions in the vehicle width direction, respectively, achieving an increase in an area S2 of a region RGE2 surrounded by the closed circuit.

Figure 7:
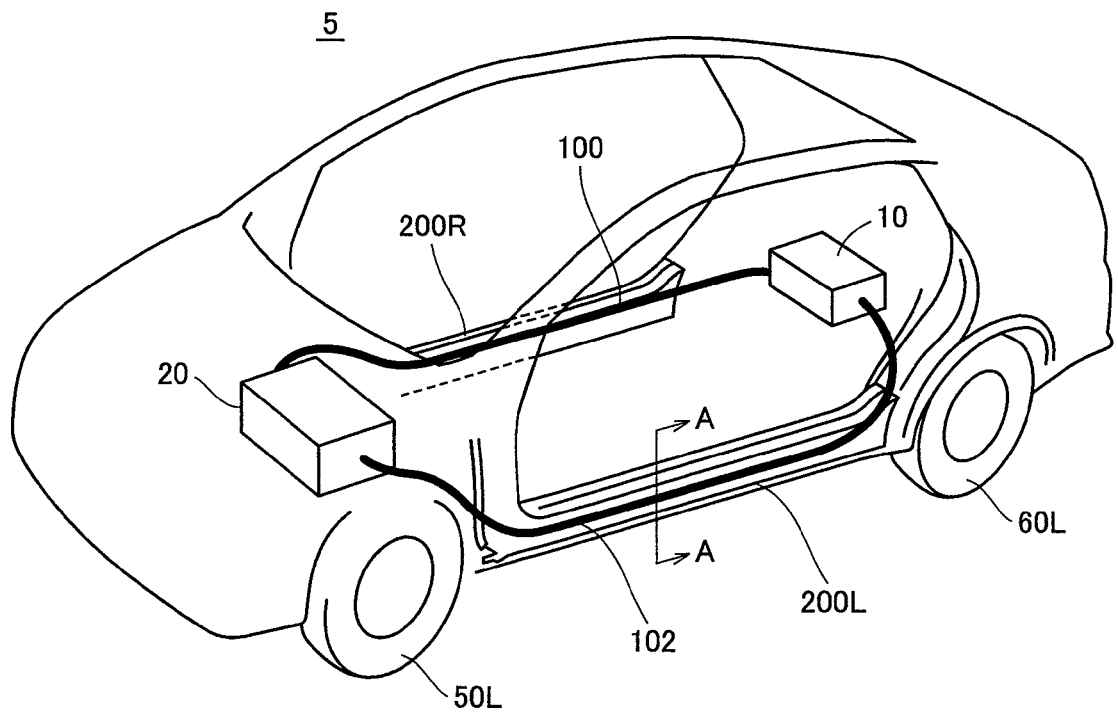
FIG. 7 is a perspective view of a hybrid vehicle to which the cabling structure shown in FIG. 6 is applied.

FIG. 7 is a perspective view of hybrid vehicle 5 to which the cabling structure shown in FIG. 6 is applied.

Referring to FIG. 7, in hybrid vehicle 5, rocker outer reinforcements 200R and 200L each forming a portion of a vehicle side surface in the vehicle width direction extend in the vehicle front-rear direction. Rocker outer reinforcements 200R and 200L constitute vehicle side frame members.

In such a vehicle body structure, electric power cable 100 is provided such that a portion thereof along the vehicle front-rear direction is placed along an inner side surface of rocker outer reinforcement 200R constituting a vehicle right side frame member in the vehicle width direction. Electric power cable 102 is provided such that a portion thereof along the vehicle front-rear direction is placed along an inner side surface of rocker outer reinforcement 200L constituting a vehicle left side frame member in the vehicle width direction.

Figure 8:
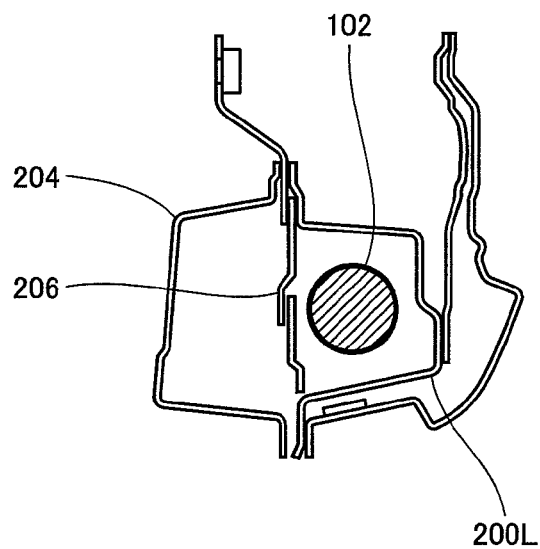
FIG. 8 is a cross sectional view showing a cross section along A-A of FIG. 7.

FIG. 8 is a cross sectional view showing a cross section along A-A of FIG. 7.

Referring to FIG. 8, rocker outer reinforcement 200L has a cross section in the vehicle width direction in a substantially U shape opened toward an inner side in the vehicle width direction.

Further, a floor side member 204 and a center body pillar 206, serving as energy absorbing members absorbing energy in the event of a side collision of the vehicle, are provided on the inner side of rocker outer reinforcement 200L in the vehicle width direction, to extend in substantially parallel in the vehicle front-rear direction. In particular, floor side member 204 is coupled to a front cross member and a rear floor cross member (not shown) placed in the vehicle width direction, and mainly serves to efficiently absorb and disperse energy in the event of a side collision of the vehicle, and to minimize deformation of the vehicle cabin. Rocker outer reinforcement 200L, floor side member 204, and center body pillar 206 are made of a lightweight and highly rigid steel plate.

Rocker outer reinforcement 200L and center body pillar 206 are coupled at both end surfaces in a vehicle vertical direction. Thereby, a space portion extending in the vehicle front-rear direction is formed between the inner side surface of rocker outer reinforcement 200L in the vehicle width direction and an outer side surface of center body pillar 206 in the vehicle width direction.

In the configuration described above, electric power cable 102 is placed in the space portion. Although not shown, electric power cable 100 is also placed in a space portion formed between rocker outer reinforcement 200R and center body pillar 206 located on a vehicle right side surface.

The cabling structure shown in FIG. 6 can be achieved by placing electric power cables 100 and 102 along the vehicle side frame members as shown in FIGS. 7 and 8, without newly providing a space for cabling. Thereby, loop inductance Lpr (FIG. 4) in the closed circuit can be increased without sacrificing space for a passenger cabin and a luggage compartment of the vehicle.

Further, since permeability µ of the closed circuit is increased by placing each of electric power cables 100 and 102 in the space portion formed between the vehicle side frame member and the energy absorbing member absorbing energy in the event of a side collision of the vehicle, the number of flux interlinkage in the closed circuit is increased. Therefore, loop inductance Lpr can be further increased.

Consequently, electric power cables 100 and 102 can be configured to have high inductance values, and ripple current Irpb flowing through battery 10 can be decreased. As a result, vibration noise in battery 10 can be suppressed without causing an increase in the size and cost of the load driving device. Further, deterioration in the electric power collecting property of battery 10 can also be suppressed.

It is to be noted that, although the first embodiment has described the configuration in which a portion of electric power cable 100 and a portion of electric power cable 102 are placed at the end portions in the vehicle width direction, respectively, the same effect can also be obtained in a configuration in which the portions thereof are placed at end portions in the vehicle vertical direction, respectively.

[Modification]

Figure 9:
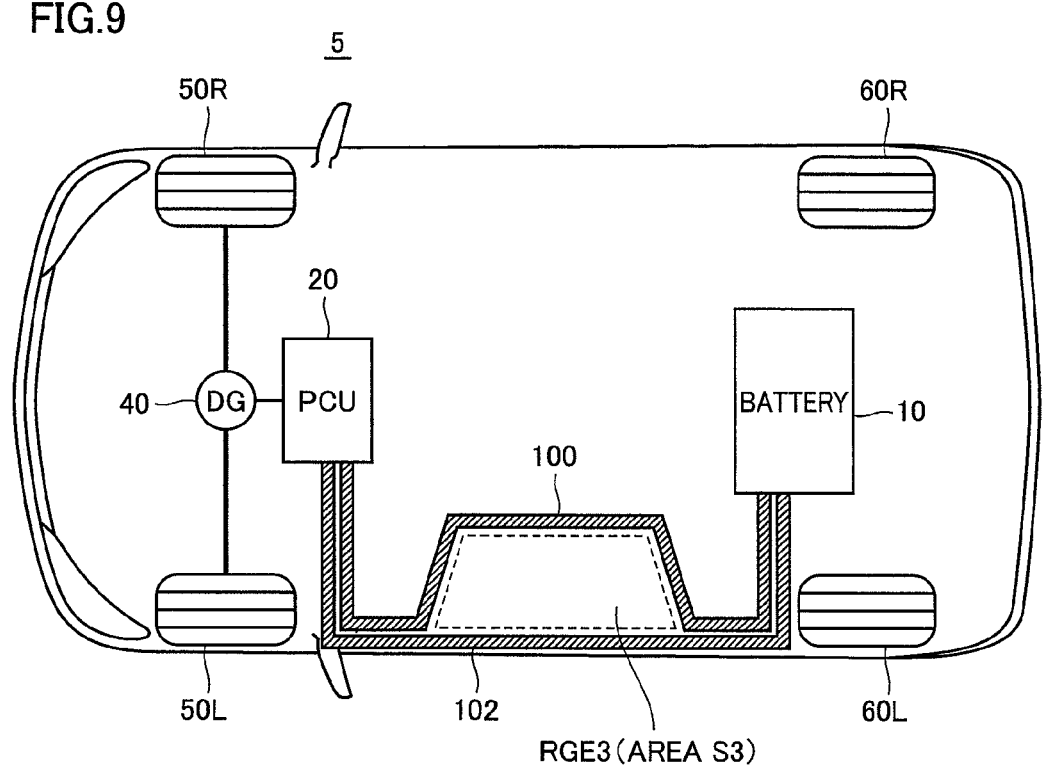
FIG. 9 is a view for illustrating a cabling structure of the electric power cables in accordance with a modification of the first embodiment of the present invention.

FIG. 9 is a view for illustrating a cabling structure of the electric power cables in accordance with a modification of the first embodiment of the present invention. Referring to FIG. 9, in the present modification, electric power cables 100 and 102 are placed in substantially parallel in the vehicle front-rear direction, between battery 10 and PCU 20. On this occasion, electric power cable 100 is placed such that, in at least a portion thereof along the vehicle front-rear direction, an interval between electric power cable 100 and electric power cable 102 is longer than the interval in the other portion thereof.

Specifically, electric power cable 102 is provided such that a portion thereof along the vehicle front-rear direction is placed at the left side end portion in the vehicle width direction. Electric power cable 100 is placed in substantially parallel with electric power cable 102, and such that, in a portion thereof along the vehicle front-rear direction, the interval between electric power cable 100 and electric power cable 100 is longer than the interval in the other portion thereof.

That is, in the example of FIG. 9, a portion in which the interval between electric power cable 100 and electric power cable 102 is relatively long is provided along the vehicle front-rear direction, and thereby an area S3 of a region RGE3 surrounded by the closed circuit is increased, when compared to the conventional cabling structure. It is to be noted that area S3 of region RGE3 can be adjusted by changing the length in the vehicle front-rear direction and the cable interval of the portion. Therefore, in a case where electric power cables 100 and 102 have too high inductance values when the cabling structure of FIG. 6 described above is employed, the cabling structure as shown in FIG. 9 may be employed.

Figure 10:
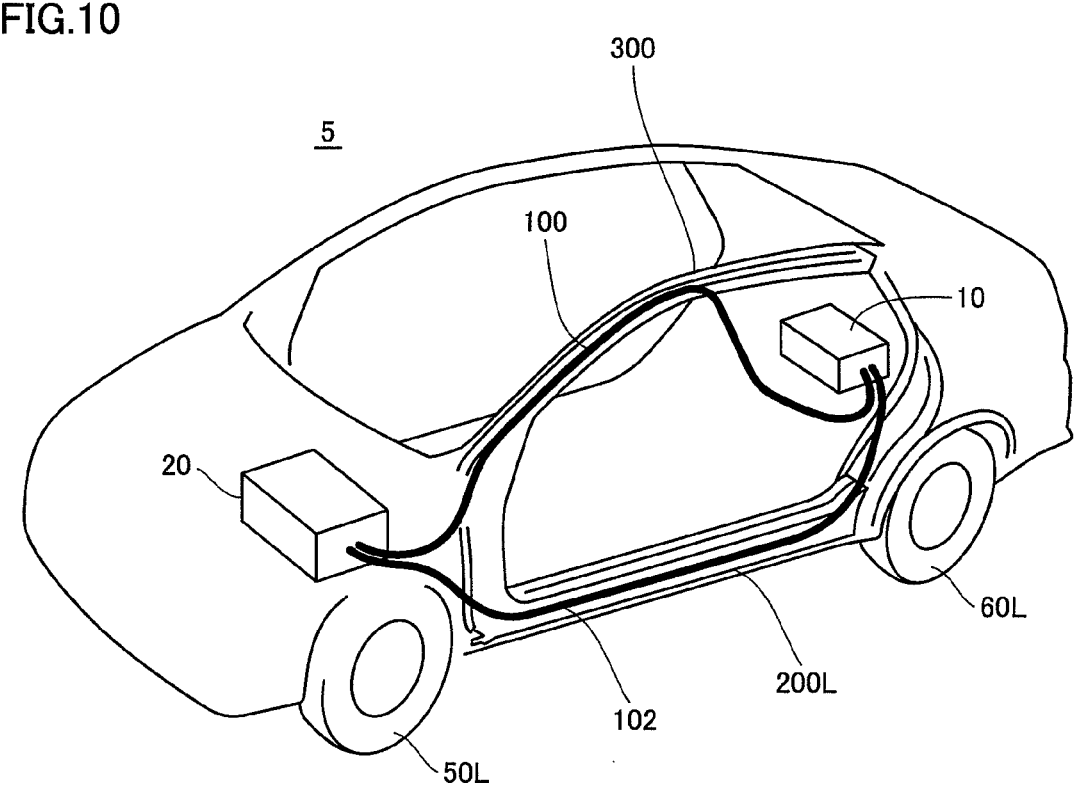
FIG. 10 is a perspective view of a hybrid vehicle to which the cabling structure shown in FIG. 9 is applied.

FIG. 10 is a perspective view of hybrid vehicle 5 to which the cabling structure shown in FIG. 9 is applied.

Referring to FIG. 10, in hybrid vehicle 5, rocker outer reinforcement 200L and a roof side outer rail 300 forming a portion of a vehicle left side surface in the vehicle width direction extend in the vehicle front-rear direction. Rocker outer reinforcement 200L and roof side outer rail 300 constitute vehicle left side frame members.

In such a vehicle body structure, electric power cable 100 is provided such that a portion thereof along the vehicle front-rear direction is placed along an inner side surface of roof side outer rail 300 in the vehicle width direction. Electric power cable 102 is provided such that a portion thereof along the vehicle front-rear direction is placed along the inner side surface of rocker outer reinforcement 200L in the vehicle width direction.

As described in FIG. 8, the portion of electric power cable 102 is placed in a space portion formed between the inner side surface of rocker outer reinforcement 200L in the vehicle width direction and the outer side surface of center body pillar 206 (not shown) in the vehicle width direction.

Although not shown, the center body pillar serving as the energy absorbing member absorbing energy in the event of a side collision of the vehicle is provided on an inner side of roof side outer rail 300 in the vehicle width direction, to extend in substantially parallel in the vehicle front-rear direction. A portion of electric power cable 100 along the vehicle front-rear direction is placed in a space portion formed between the inner side surface of roof side outer rail 300 in the vehicle width direction and the outer side surface of the center body pillar in the vehicle width direction.

The cabling structure shown in FIG. 9 can be achieved by placing electric power cables 100 and 102 along the vehicle side frame members as shown in FIG. 10, without newly providing a space for cabling. Thereby, loop inductance Lpr in the closed circuit can be increased without sacrificing space for a passenger cabin and a luggage compartment of the vehicle.

Further, since permeability µ of the closed circuit is increased by placing each of electric power cables 100 and 102 in the space portion formed between the vehicle side frame member and the energy absorbing member absorbing energy in the event of a side collision of the vehicle, the number of flux interlinkage in the closed circuit is increased. Therefore, loop inductance Lrp can be further increased.

[Second Embodiment]

Figure 11:
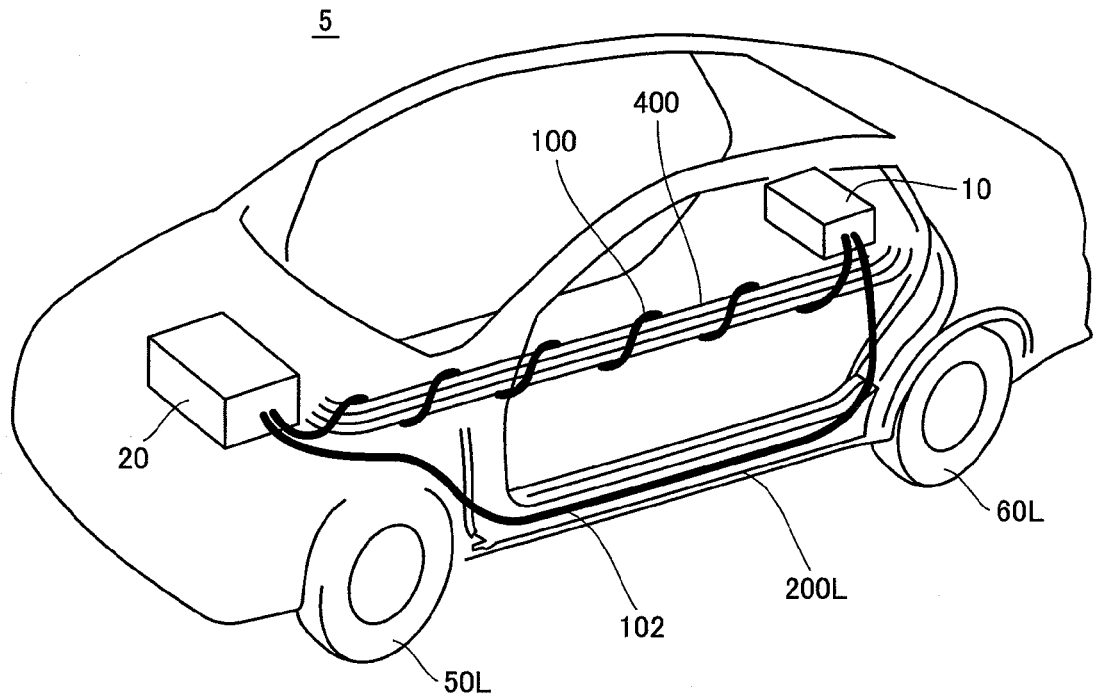
FIG. 11 is a perspective view of a hybrid vehicle to which a cabling structure of the electric power cables in accordance with a second embodiment of the present invention is applied.

FIG. 11 is a perspective view of hybrid vehicle 5 to which a cabling structure of the electric power cables in accordance with a second embodiment of the present invention is applied.

Referring to FIG. 11, in hybrid vehicle 5, rocker outer reinforcement 200L and a door belt line reinforcement 400 forming a portion of the vehicle left side surface in the vehicle width direction extend in the vehicle front-rear direction. Rocker outer reinforcement 200L and door belt line reinforcement 400 constitute vehicle left side frame members.

In such a vehicle body structure, electric power cable 102 is provided such that a portion thereof along the vehicle front-rear direction is placed along the inner side surface of rocker outer reinforcement 200L in the vehicle width direction. As described in FIG. 8, the portion of electric power cable 102 is placed in the space portion formed between the inner side surface of rocker outer reinforcement 200L in the vehicle width direction and the outer side surface of center body pillar 206 (not shown) in the vehicle width direction.

On the other hand, electric power cable 100 is placed such that at least a portion thereof along the vehicle front-rear direction is spirally wound around door belt line reinforcement 400. With such a configuration of electric power cable 100, inductance Lp1 (FIG. 4) of electric power cable 100 can be increased. On this occasion, inductance Lp1 is increased in proportion to the square of the number of turns of electric power cable 100 and to the permeability of door belt line reinforcement 400.

Loop inductance Lpr (FIG. 4) that is present in the closed circuit and inductance Lp1 of electric power cable 100 can be increased by providing a portion in which the interval between electric power cable 100 and electric power cable 102 is relatively long along the vehicle front-rear direction, and employing the configuration in which electric power cable 100 is placed to be wound around the vehicle side frame member, as shown in FIG. 11. As a result, electric power cables 100 and 102 can be configured to have high inductance values, and thus ripple current Irpb flowing through the battery can be decreased.

It is to be noted that, although the example of FIG. 11 has described the configuration in which only electric power cable 100 is placed to be wound around the vehicle side frame member, a configuration in which the other electric power cable 102 is also placed to be wound around the vehicle side frame member may be employed. With such a configuration, inductance Lp2 of electric power cable 102 is also increased, and thereby the inductances of electric power cables 100 and 102 can be further increased.

[Modification]

Figure 12:
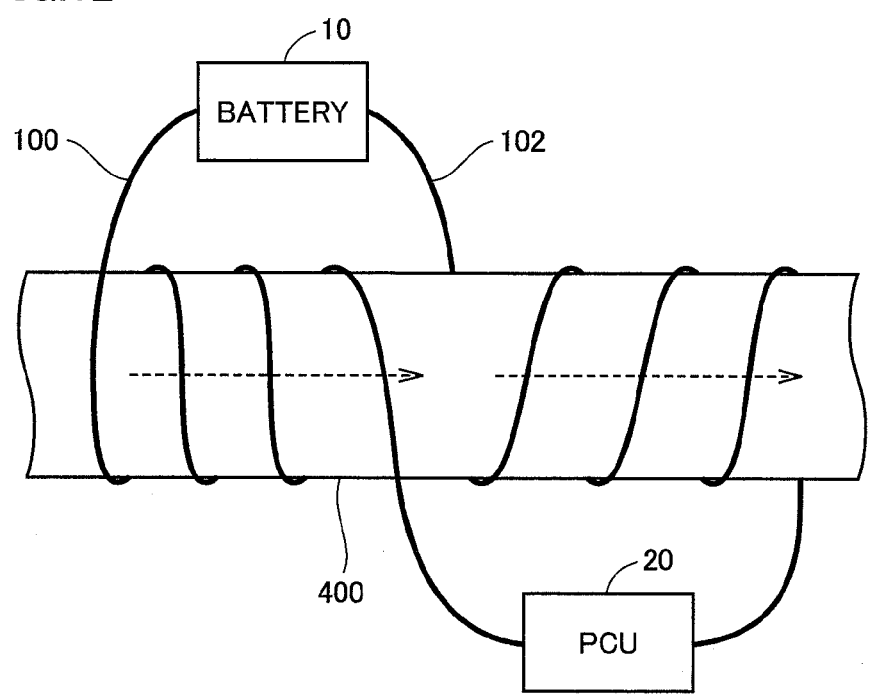
FIG. 12 is a view for illustrating a cabling structure of the electric power cables in accordance with a modification of the second embodiment of the present invention.

FIG. 12 is a view for illustrating a cabling structure of the electric power cables in accordance with a modification of the second embodiment of the present invention.

Referring to FIG. 12, in the present modification, electric power cables 100 and 102 are placed to be spirally wound around a common vehicle side frame member (for example, door belt line reinforcement 400).

Specifically, electric power cable 100 is placed such that a portion thereof along the vehicle front-rear direction is spirally wound around door belt line reinforcement 400, in a first winding direction. Electric power cable 102 is placed such that a portion thereof along the vehicle front-rear direction is spirally wound around door belt line reinforcement 400, in a second winding direction opposite to the first winding direction.

With such a cabling structure, inductances Lp1 and Lp2 of electric power cables 100 and 102, respectively, are increased in proportion to the square of the number of turns and to the permeability of door belt line reinforcement 400. Further, since fluxes in the same direction are generated in the electric power cables, the number of flux interlinkage is increased. As a result, electric power cables 100 and 102 can be configured to have high inductance values, and thus ripple current Irpb flowing through the battery can be decreased.

It is to be noted that, although the cabling structure shown in FIGS. 11 and 12 employs the configuration in which at least one of electric power cables 100 and 102 is placed to be wound around the vehicle side frame member, the inductance of the electric power cable can also be increased by simply spirally placing the electric power cable along the vehicle front-rear direction. In such a case, the inductance of the electric power cable is increased in proportion to the square of the number of turns.

As described above, the first and second embodiments of the present invention have described that PCU 20 is mounted to a hybrid vehicle. In the present invention, however, PCU 20 may be mounted to an electric vehicle or a fuel cell vehicle. Further, the application of the present invention is not limited to such a configuration, and the present invention is commonly applicable to a load driving device configured to include a switching element and receiving electric power from a power supply to drive another electric load of a vehicle.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

Industrial Applicability

The present invention is applicable to a load driving device configured to include a switching element and receiving electric power from a battery to drive an electric load.

The invention claimed is:

1. A load driving device driving an electric load mounted to a vehicle, comprising:
   a power supply;
   an electric power conversion device configured to include a switching element and converting electric power between DC power from said power supply and AC power driving said electric load through switching control of said switching element; and
   first and second electric power lines forming an electric power supply path between said power supply and said electric power conversion device,
   wherein said first electric power line is placed between one electrode of said power supply and said electric power conversion device, and at least a portion along a vehicle front-rear direction of said first electric power line is placed at one side end portion in a vehicle width direction, and
   said second electric power line is placed between the other electrode of said power supply and said electric power conversion device, and at least a portion along said vehicle front-rear direction of said second electric power line is placed at the other side end portion in said vehicle width direction.

2. The load driving device according to claim 1, wherein said at least a portion of each of said first and second electric power lines is placed in a space portion formed in a vehicle frame member to extend in said vehicle front-rear direction.

3. The load driving device according to claim 2, wherein said space portion is a gap portion formed between said vehicle frame member and an energy absorbing member absorbing energy in the event of a collision of said vehicle.

4. The load driving device according to claim 1, wherein at least one of said first and second electric power lines is placed such that said at least a portion thereof is spirally wound around a vehicle frame member.

5. The load driving device according to claim 1, wherein said electric load is a motor (M1) for driving a vehicle, and
said power supply and said electric power conversion device are mounted to be separated in a vehicle front-rear direction.

6. The load driving device according to claim 1, wherein the electric power conversion device is configured to boost DC voltage from the power source and convert the boosted DC voltage into an AC voltage.

7. The load driving device according to claim 6, wherein the electric power conversion device is further configured to convert an AC voltage from a motor generator into a DC voltage to charge the power source.

8. The load driving device according to claim 1, wherein said electric load is a motor power output device that transmits power to the vehicle's wheels.

9. The load driving device according to claim 1, wherein the electric power conversion device is provided at a front of the vehicle, and the power supply is provided at a rear of the vehicle.

10. The load driving device according to claim 9, wherein the power supply is provided at a rear of the vehicle's seats.

11. A load driving device driving an electric load mounted to a vehicle, comprising:
a power supply;
an electric power conversion device configured to include a switching element and converting electric power between DC power from said power supply and AC power driving said electric load through switching control of said switching element; and
first and second electric power lines forming an electric power supply path between said power supply and said electric power conversion device,
wherein said first electric power line is placed between one electrode of said power supply and said electric power conversion device, and at least a portion along a vehicle front-rear direction of said first electric power line is placed at one side end portion in a vehicle vertical direction, and
said second electric power line is placed between the other electrode of said power supply and said electric power conversion device, and at least a portion along said vehicle front-rear direction of said second electric power line is placed at the other side end portion in said vehicle vertical direction.

12. The load driving device according to claim 11, wherein said at least a portion of each of said first and second electric power lines is placed in a space portion formed in a vehicle frame member to extend in said vehicle front-rear direction.

13. The load driving device according to claim 12, wherein said space portion is a gap portion formed between said vehicle frame member and an energy absorbing member absorbing energy in the event of a collision of said vehicle.

14. The load driving device according to claim 11, wherein at least one of said first and second electric power lines is placed such that said at least a portion thereof is spirally wound around a vehicle frame member.

15. The load driving device according to claim 11, wherein the electric power conversion device is configured to boost DC voltage from the power source and convert the boosted DC voltage into an AC voltage.

16. The load driving device according to claim 15, wherein the electric power conversion device is further configured to convert an AC voltage from a motor generator into a DC voltage to charge the power source.

17. The load driving device according to claim 11, wherein said electric load is a motor power output device that transmits power to the vehicle's wheels.

18. The load driving device according to claim 11, wherein the electric power conversion device is provided at a front of the vehicle, and the power supply is provided at a rear of the vehicle.

19. The load driving device according to claim 18, wherein the power supply is provided at a rear of the vehicle's seats.

20. A load driving device, comprising:
a power supply;
an electric power conversion device configured to include a switching element and converting electric power between DC power from said power supply and AC power driving an electric load through switching control of said switching element; and
first and second electric power lines forming an electric power supply path between said power supply and said electric power conversion device,
wherein said first electric power line is placed between one electrode of said power supply and said electric power conversion device,
said second electric power line is placed between the other electrode of said power supply and said electric power conversion device, and
at least one of said first and second electric power lines is placed such that at least a portion thereof along a longitudinal direction is spirally placed, wherein
said electric load is a motor (M1) for driving a vehicle,
said power supply and said electric power conversion device are mounted to be separated in a vehicle front-rear direction, and
at least one of said first and second electric power lines is placed such that at least a portion thereof along said vehicle front-rear direction is spirally wound around a vehicle frame member.

21. The load driving device according to claim 20, wherein said first electric power line and said second electric power line are placed such that said at least a portion of said first electric power line and said at least a portion of said second electric power line are wound around said vehicle frame member in common, in winding directions opposite to each other.

22. The load driving device according to claim 20, wherein the electric power conversion device is configured to boost DC voltage from the power source and convert the boosted DC voltage into an AC voltage.

23. The load driving device according to claim 22, wherein the electric power conversion device is further configured to convert an AC voltage from a motor generator into a DC voltage to charge the power source.

* * * * *